(12) United States Patent
Allen

(10) Patent No.: US 12,227,265 B2
(45) Date of Patent: Feb. 18, 2025

(54) SURFACE/SUBMERSIBLE CRAFT

(71) Applicant: Subsea Craft Limited, Havant (GB)

(72) Inventor: Graham Allen, Edinburgh (GB)

(73) Assignee: Subsea Craft Limited, Portsmouth Hampshire (GB)

( * ) Notice: Subject to any disclaimer, the term of this patent is extended or adjusted under 35 U.S.C. 154(b) by 425 days.

(21) Appl. No.: 17/429,332

(22) PCT Filed: Feb. 7, 2020

(86) PCT No.: PCT/IB2020/050986
§ 371 (c)(1),
(2) Date: Aug. 7, 2021

(87) PCT Pub. No.: WO2020/161677
PCT Pub. Date: Aug. 13, 2020

(65) Prior Publication Data
US 2022/0106016 A1 Apr. 7, 2022

(30) Foreign Application Priority Data
Feb. 8, 2019 (GB) ..................................... 1901786

(51) Int. Cl.
*B63B 1/12* (2006.01)
*B63G 8/00* (2006.01)
*B63G 8/08* (2006.01)

(52) U.S. Cl.
CPC ................ *B63B 1/12* (2013.01); *B63G 8/001* (2013.01); *B63G 8/08* (2013.01)

(58) Field of Classification Search
CPC .... B63B 1/00; B63B 1/12; B63G 8/00; B63G 8/001; B63G 8/08
(Continued)

(56) References Cited

U.S. PATENT DOCUMENTS 3,598,074 A   8/1971  Schubert
7,246,566 B2* 7/2007  Marion .................. B63G 8/001
                                                 114/312

(Continued)

FOREIGN PATENT DOCUMENTS

DE        426521 C    1/1927
DE       2640077 A1   3/1978
(Continued)

OTHER PUBLICATIONS

JPO, Office Action for JP Patent Application Serial No. 2021-546245, pp. 23 (mailed Oct. 5, 2023), English and Japanese language versions.
(Continued)

*Primary Examiner* — Lars A Olson
(74) *Attorney, Agent, or Firm* — UltimatEdge IP Law Group, P.C.; Dean G. Stathakis

(57) ABSTRACT

A surface/submersible water-craft, comprising: a hull, means for submerged propulsion provided in or on the hull, means for surface propulsion provided in or on the hull, floodable-on-submerging crew accommodation provided in the hull and a canopy arranged for closing the floodable crew accommodation for protecting the crew from water flow past the craft, the canopy being openable for crew exit from the craft whilst submerged at a destination.

21 Claims, 28 Drawing Sheets

(58) Field of Classification Search
USPC .......................................................... 114/312
See application file for complete search history.

(56) References Cited

U.S. PATENT DOCUMENTS

| | | |
|---|---|---|
| 2012/0071046 A1 | 3/2012 | Matsumoto |
| 2014/0193206 A1 | 7/2014 | Montousse |

FOREIGN PATENT DOCUMENTS

| | | |
|---|---|---|
| EP | 0716012 A1 | 6/1996 |
| EP | 3006324 A1 | 4/2016 |
| GB | 2060504 A | 5/1981 |
| JP | H0858675 A | 3/1996 |
| JP | 2001071993 A | 3/2001 |
| KR | 20090023060 A | 3/2009 |
| KR | 101304775 B1 | 8/2013 |
| KR | 101731019 B1 | 4/2017 |
| SE | 526748 C2 | 11/2005 |
| WO | 2009002520 A2 | 12/2008 |
| ZA | 200808670 B | 10/2008 |

OTHER PUBLICATIONS

WIPO, PCT Form ISA210, International Search Report for IA Patent Application Serial No. PCT/IB2020/050986, pp. 5 (mailed Jun. 8, 2020).

WIPO, PCT Form ISA237, Written Opinion for IA Patent Application Serial No. PCT/IB2020/050986, pp. 5 (mailed Jun. 8, 2020).

WIPO, PCT Form IPEA409, International Preliminary Report on Patentability for IA Patent Application Serial No. PCT/IB2020/050986, pp. 19 (mailed Jun. 23, 2021).

EPO, Rule 71(3) EPC Communication Intention to Grant for EP Patent Application Serial No. 20709709.8, pp. 55 (mailed Nov. 10, 2022).

SAIP, Notification of Substantive Examination Report for SA Patent Application Serial No. 521422684, pp. 6 (mailed Sep. 27, 2022).

UAEPO, Search Report for AE Patent Application Serial No. P6001361/2021, pp. 2 (mailed Jan. 5, 2024).

UAEPO, First Examination Report for AE Patent Application Serial No. P6001361/2021, pp. 5 (mailed Jan. 5, 2024).

* cited by examiner

SURFACE/SUBMERSIBLE CRAFT

This application is a 35 U.S.C. § 371 U.S. national stage patent application which claims the benefit of priority and is entitled to the filing date of International Patent Application PCT/IB2020/050986, filed Feb. 7, 2020, an application that claims the benefit of priority and is entitled to the filing date of GB Patent Application 1901786.2, filed Feb. 8, 2019, the content of each of which is hereby incorporated by reference in its entirety.

The present invention relates to surface/submersible craft.

In this specification, the term "surface/submersible craft" is used to mean a craft that has the ability to travel autonomously both submerged and on the surface. Submarines have this capability, but the invention relates to a particular type of surface/submersible craft. The term submarine is not used for the invention, because the craft of the invention has some capabilities more akin to those of a surface craft than a submarine, including the higher surface speed than submerged speed.

In our PCT application No. PCT/GB2018/052319 ("Our Submersible Multi-Hull Craft Application"), whose abstract is set out below, we described a catamaran surface/submersible craft. Our Earlier International Application was unpublished at the priority date of this application. Its abstract, now published in WO 2019/034875 is as follows: "A submergible multi-hull craft has identical port and starboard hulls, each has watertight compartments and an open cockpit amidships. The hulls are fixedly interconnected by four tubular beams. A deck extends between the hulls over the beams. Floodable and blowable buoyancy tanks with compressed air reservoirs are provided in the compartments and in the cockpit. Each hull has a steerable thrust diesel engine propulsion in a watertight enclosure. The hulls each have two, forward, thrusters with cowlings with propellers. The thrusters can be stowed for surface passage and swung out from the recesses in the hulls when submerged, They can be rotated to thrust up or down. Aft, each hull has two further, aft, thrusters. Astern of them trim surfaces are provided between skegs."

The object of the present invention is to provide an improves surface/submersible craft.

According to the invention there is provided a surface/submersible water-craft, comprising:
 a hull,
 means for submerged propulsion provided in or on the hull,
 means for surface propulsion provided in or on the hull,
 floodable-on-submerging crew accommodation provided in the hull and
 a canopy closing the floodable crew accommodation for protecting the crew from water flow past the craft, the canopy being openable for exit of the crew from the craft at a destination.

Whilst it can be envisaged that the hull may have other permanently dry, or indeed permanently wet, spaces; preferably, the entirety of the interior of the hull, save only the stowage spaces for equipment which must be kept dry, and ballast and trim tanks are floodable-on-submerging.

Again, it can be envisaged that the ballast and trim tanks could be flooded from surrounding water; in the interest of hull integrity, the ballast and trim tanks are floodable-on-submerging from within the hull and blowable into the hull.

Normally the hull will be formed for considerably faster speeds on the surface than submerged. This can be achieved by wave piercing or planing hull form. Alternatively it can be provided with hydrofoils for surface travel, the hydrofoils being withdrawable for submerged travel.

An engine of the surface propulsion means can be provided in a floodable engine room, with the engine preferably being an internal combustion engine. Alternatively, a motor of the surface propulsion means is an electric motor provided in a sealed stowage space enclosing the motor.

Preferably the floodable crew accommodation and the floodable engine room, where provided, and indeed the entirety of the hull is provided with low level sea cocks and high level air ports, whereby in diving the accommodation and engine room can be filled with water via the sea cocks from below with upwards escape of air through the air ports and in surfacing the accommodation and engine room can be drained of water via the sea cocks from below with ingress of air through the air ports.

Whilst each compartment of the hull could be provided with its own sea cocks, preferably the compartments are provided with drains through bulkheads whereby the number of sea cocks needed is economised on. In the preferred embodiment, fore and aft, port and starboard sea cocks are provided in the crew accommodation.

The sea cocks can be provided with directional means for drawing water into the crew accommodation and engine room, where provided, on diving and/or drawing water from the crew accommodation and engine room on surfacing. A single set of directional means can be provided and be adjustable for drawing water in and drawing water out. Alternatively, two sets of directional means can be provided, one for drawing water in and the other for drawing water out. Further, the directional means can be withdrawable from water flow past the hull when not in use. Also, the sea cocks can be closable when not in use.

Normally:
 the submerged propulsion means will be electrical with propellers above the normal waterline when surfaced;
 the hull will have a lower planing hull form and a hydro-dynamically complementary upper portion for balanced up-thrust and down-thrust under submerged propulsion;
 the surface propulsion means can be electrical or fuel-burning and preferably comprises a jet drive.

In a preferred embodiment an internal-combustion engine of the surface propulsion means is provided in a floodable engine room. Whilst the engine could be enclosed within the engine room within an enclosure having a closable air inlet and a closable exhaust, or at least an exhaust passing out of the enclosure and having a closable valve; in the preferred embodiment, the engine is within a floodable space with the engine room, again with a closable air inlet and a closable exhaust.

Further, in the preferred embodiment:
 the hull includes side decks, meeting substantially flat runs aft of the planing hull at pintail formss without a transom at the stern;
 the flat run aft are angled upwards and outwards as are the aftmost portions of the side decks;
 the flat runs aft meet hull sides having the side decks above them at least amidships at hard chines;
 the side decks blend into a fore deck;
 trim fins are provided at the stern aft of the side decks and flat runs aft;
 vertically oriented thrusters are mounted in apertures in the side decks and flat runs aft, the apertures being closable for surface passage;
 upper sides taper aft to an upright, pintail form, preferably provided with a rudder;

forrard hydroplanes are mounted above the surface water line, the hydroplanes preferably including vertical thrusters mounted in them.

The submerged propulsion means will normally be by electric motor, for which batteries are provided in the hull. The surface propulsion means will normally include an internal combustion ("IC") engine, reciprocating or turbine, driving either directly or indirectly via an electric drive. A single propeller or other device reacting on water for propulsion, such as a jet drive, can be provided for submerged and surface propulsion, particularly where the surface propulsion is by an indirect electric drive, which can use the electric motor. Alternatively, the internal combustion engine can drive a separate propeller, etc. via a mechanical drive. It is possible for both the electric motor and the IC engine to drive via a mechanical drive, having clutches for the electric motor and the IC engine.

The canopy can be two part as in a clam shell closing over the crew accommodation and provide an upwards egress. Alternatively, in two part form it can be arranged as a gull's wing for side egress, particularly where the craft is wide enough for two crew abreast. Again, the canopy can be in two part form, with parts being part circular cylindrical and arranged to open with circumferential movement, from over the crew accommodation to at least partially under it. The canopy can also be in single part form, either sliding backwards or pivoting at one side or one end to open. Circumferential or sliding movement are preferred in avoiding bulk displacement of water in the direction of opening of canopy. Where the canopy is slideable, it can be split centrally, whereby half can slide forwards and half backwards, economising on the length required for the canopy to slide over.

To help understanding of the invention, specific embodiments and variants thereof will now be described by way of example and with reference to the accompanying drawings, in which.

Figure 1:
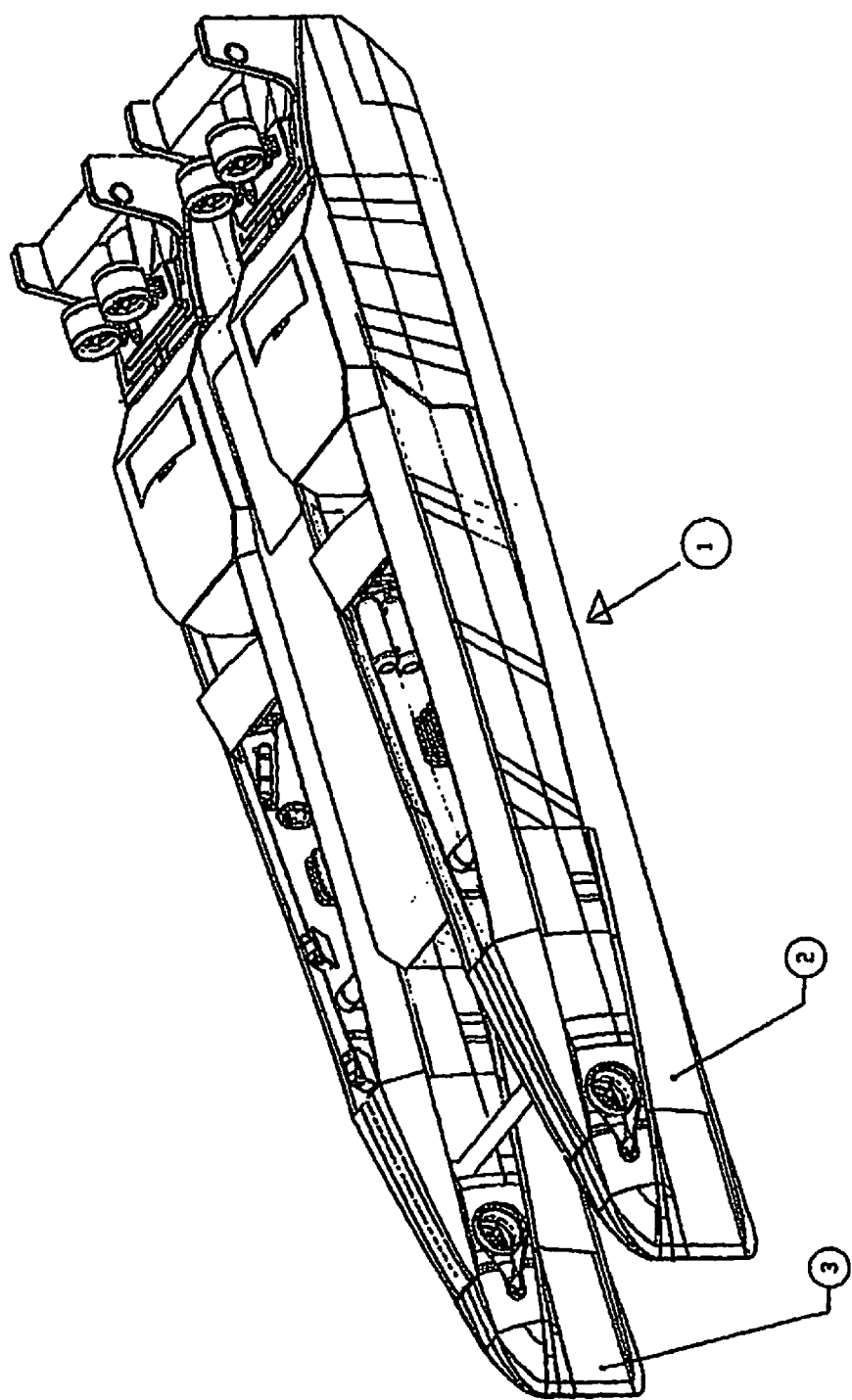
FIG. 1 is FIG. 1 of our PCT application No. PCT/GB2018/052319 ("Our Earlier International Application"), now published under No WO 2019/034875.
Figure 2:
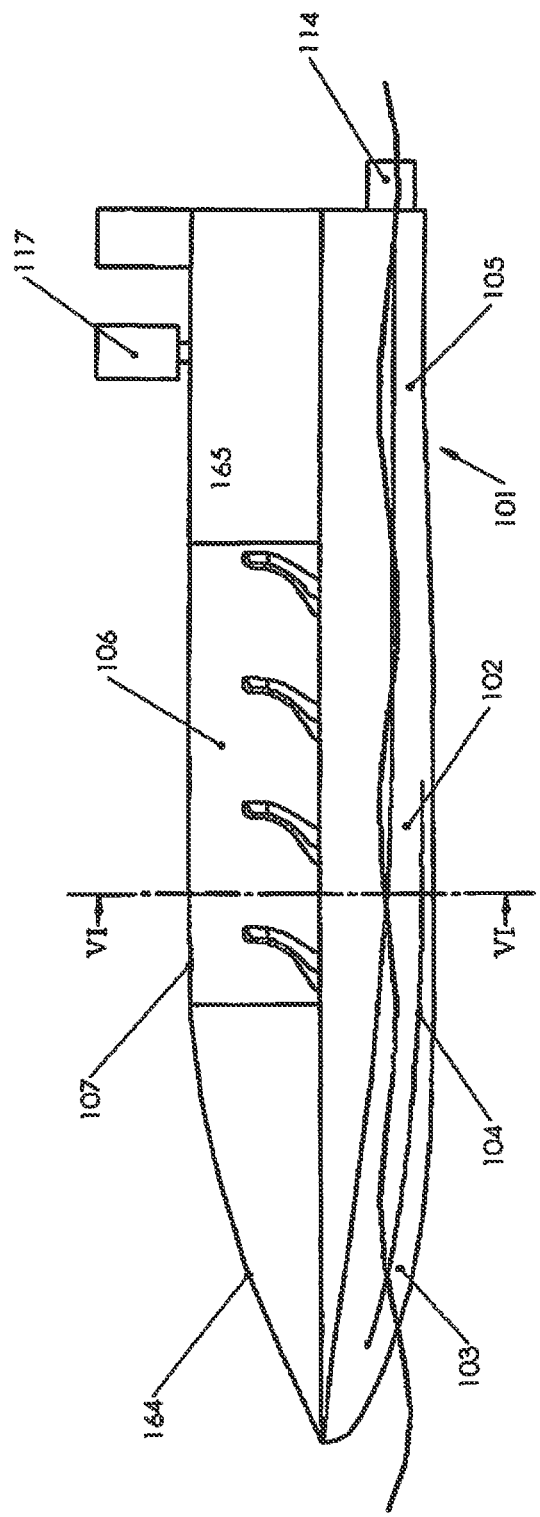
FIG. 2 is a side view of a surface/submersible craft of the invention at rest on the surface.
Figure 3:
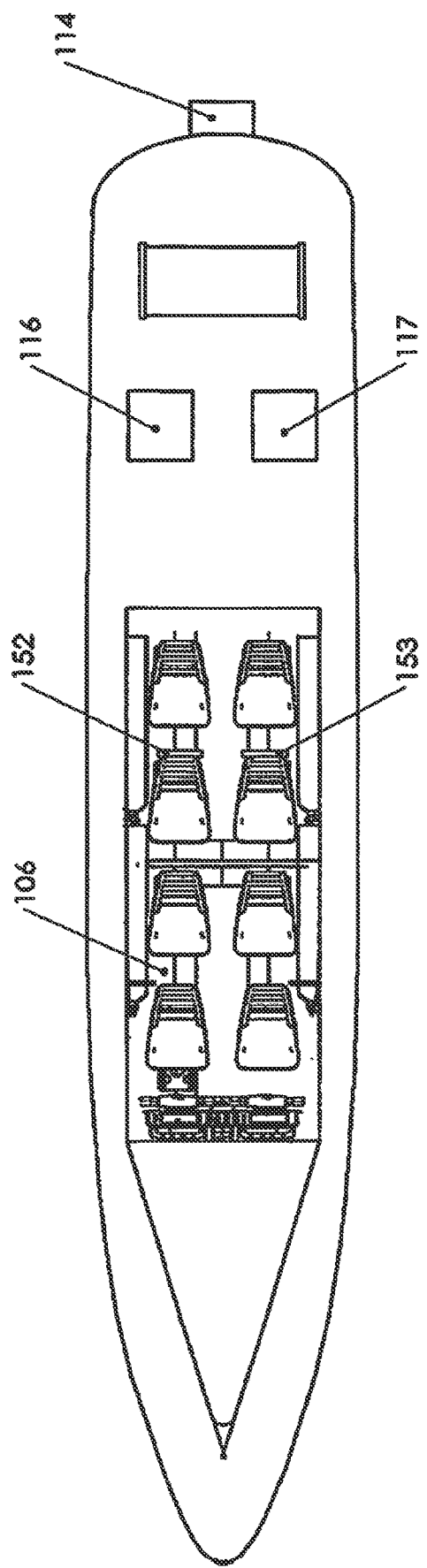
FIG. 3 is a plan view of the craft of FIG. 2.
Figure 4:
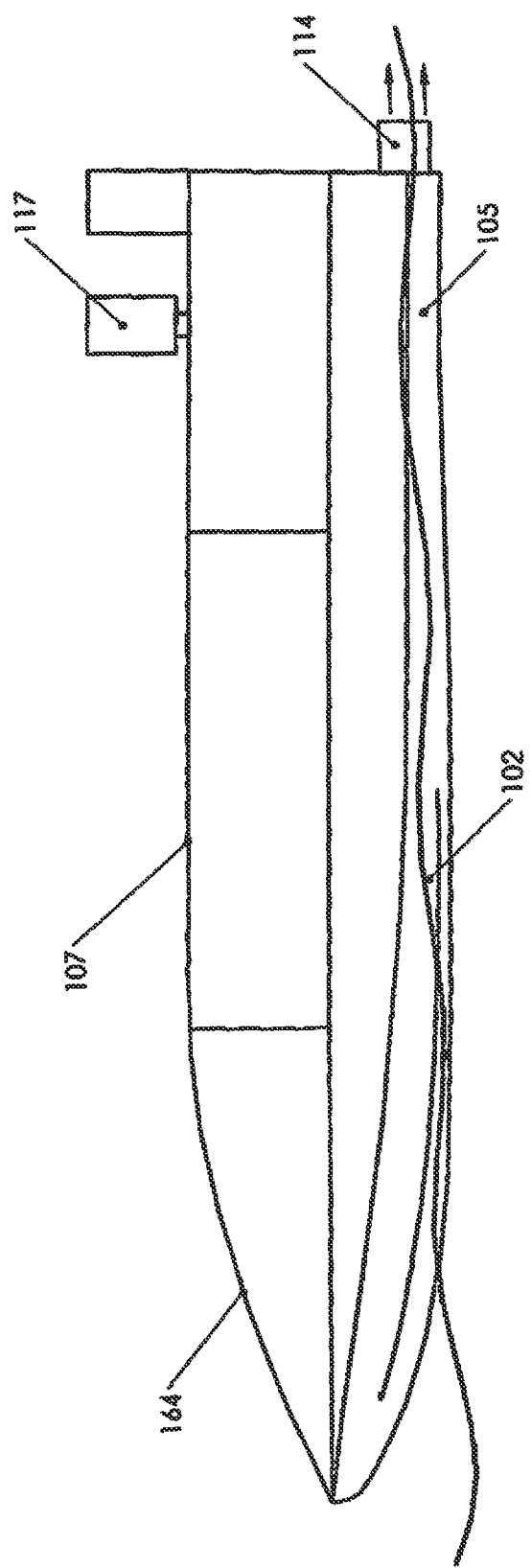
FIG. 4 is a side view of the craft of FIG. 2 at planing speed on the surface.
Figure 5:
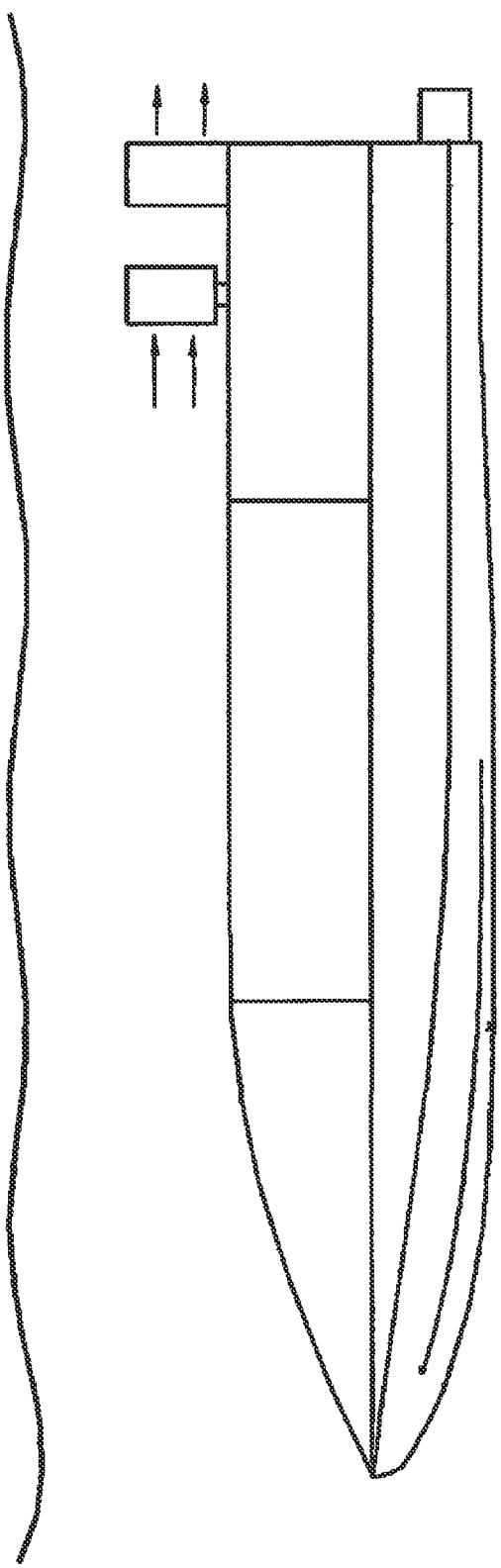
FIG. 5 is a similar side view of the craft of FIG. 2 travelling submerged.
Figure 6:
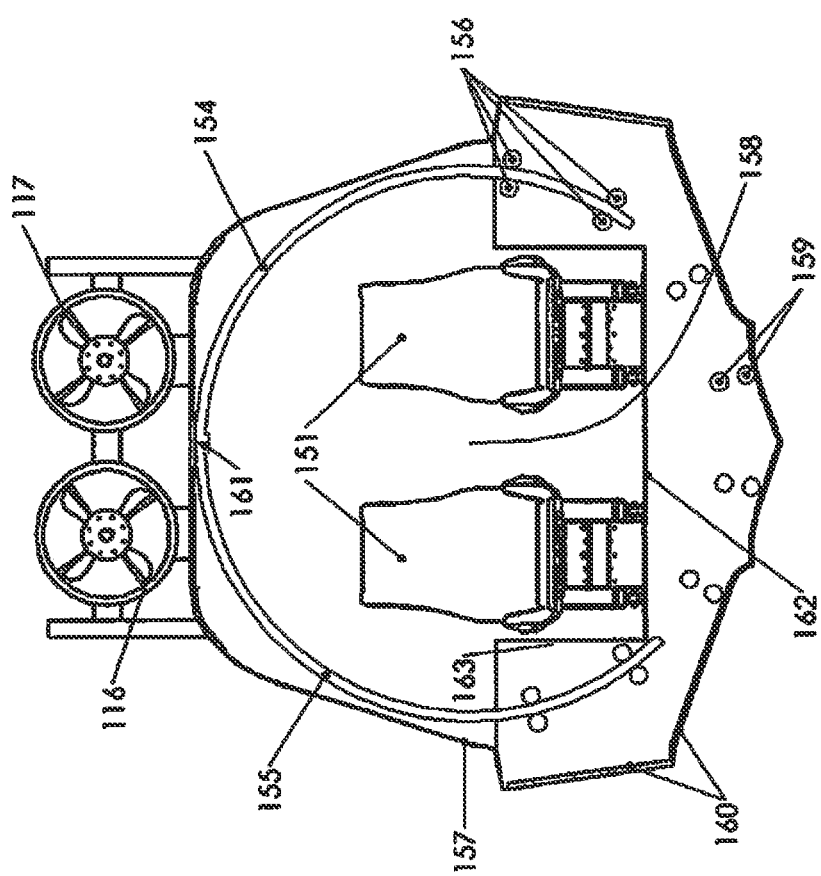
FIG. 6 is a cross-sectional front view on the line VI-VI in FIG. 2, through crew accommodation with a canopy closed.
Figure 7:
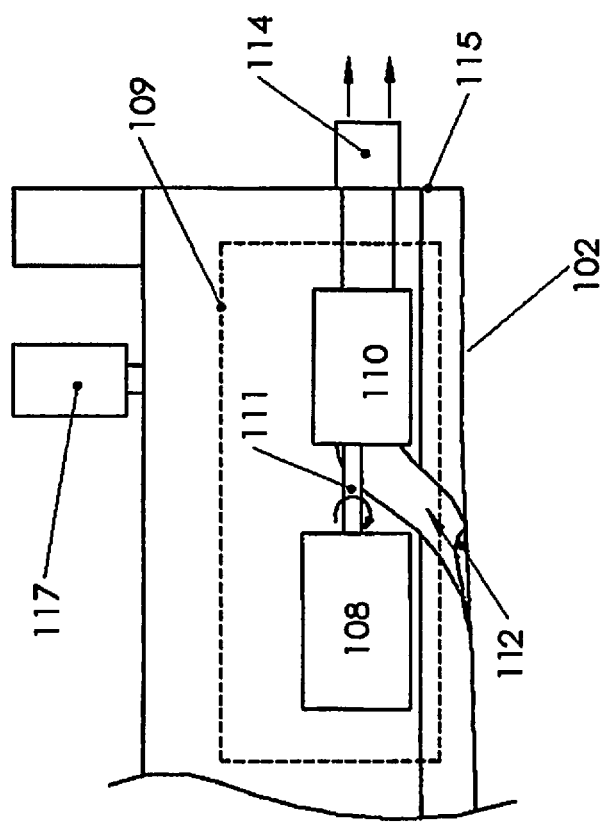
FIG. 7 is a diagrammatic scrap side view of a surface propulsion internal propulsion engine of the craft of FIG. 2.

Referring to the drawings, FIG. 1 shows, the craft of our Submersible Multi-Hull Craft Application of which the abstract is quoted about. In more detail, FIG. 1 shows:

A submergible multi-hull craft 1 has substantially identical a port and starboard hulls 2,1 3. Each has a watertight forrard compartment 4, a watertight aft compartment 5 and an open cockpit 6 amidships. The hulls are fixedly interconnected by four tubular beams 11,12,13,14. A deck 19 extends between the hulls over the beams 12,13,14. Floodable and blowable buoyancy tanks 21,22,23 with integral compressed air reservoirs and are provided as a forrard tank 21 in the forrard compartment 4, a midships tank 22 in the cockpit 6 and three aft tanks 23 in the aft compartment, three being provided in view of the mass of the engines referred to below. Crew air bottles 24 are provided in the cockpit. The cockpit is pumpable for surface passage floodable for submerged passage.

Each hull has in its aft compartment a steerable thrust diesel engine propulsion system 25 with a waterjet thrust unit and a watertight enclosure 26 for flooding the aft compartment with the engine remaining dry. Forrard, the hulls each have two, forrard, thrusters 31 having cowlings 34 in which electrically driven propellers 35 are journalled. The thrusters can be stowed for surface passage and swung out from the recesses in the hulls when submerged and powered to thrust ahead or astern. They can be rotated to thrust up or down to provide vectored thrust for assisting in surfacing or diving. Aft, each hull has two further, aft, thrusters 41 provided. Astern of them trim surfaces 26 are provided between skegs 27. When submerged, the thrusters can drive ahead or astern.

The craft of our earlier application has certain limitations that we have sought to improve upon.

Referring to FIGS. 2 to 5, a surface/submersible craft 101 of the invention is shown with a hull 102 having a planing form generating appreciable hydrodynamic lift to raise much of the wetted surface above the surface of the sea, or other body of water, on which it is travelling at elevated speed when not submerged. The hull has a V 103 cross-sectional shape forrard blending into a hard chine 104 flatter, bottom 105 shape aft providing the planing surface. The planing hull form is potentially more compact than our earlier wave piercing catamaran wave form, providing advantage in airportability. Planing form hulls are well known and the full detail of the hull's form will not be described.

The hull has a crew accommodation 106 at which it is of generally U-shaped cross-section, with a closable canopy 107 over the accommodation. Whilst the canopy can be open for surface travel, it is conveniently closed not only for surface travel but also for submerged travel. The canopy potentially provides protection from buffeting of the crew at the fast submerged speed, which is substantially less than the fast surface speed, typically respectively 8 knots and 30 knots.

Aft of the crew accommodation an internal combustion engine 108 is mounted in a watertight engine compartment 109. The IC engine is for surface travel and drives a main jet drive 110 via a shaft 111. The jet drive has a suction inlet 112 at a position towards the stern of the craft in the flatter bottom 105 of the hull, which is permanently wetted even when the craft is planing on the surface. A steerable jet nozzle 114 is provided at the stern 115, which is tapered or fine for drag reduction when submerged.

In this embodiment, submerged propulsion is provided by a pair of electrically driven propellers 116,117, mounted on the stern in the manner of Our Earlier International Application. It should be noted that the wave piercing hull of that application is not employed in this craft in interests of compactness fore and aft.

Figure 8:
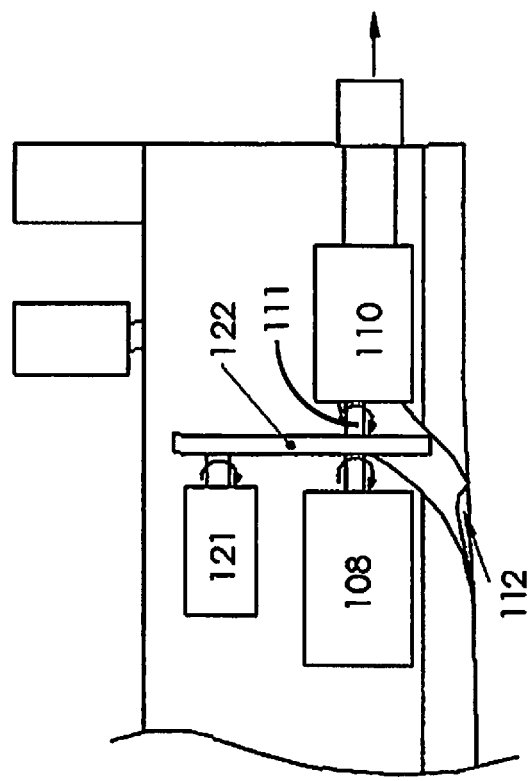
FIG. 8 is a similar diagrammatic side view of another craft of the invention.

In the embodiment of FIG. 8, an electric motor 121 is provided, for submerged propulsion, also in the engine compartment. It drives the jet drive mechanically via a clutched drive mechanism 122. This declutches the IC engine and connects the electric motor to the drive 110 instead.

Figure 9:
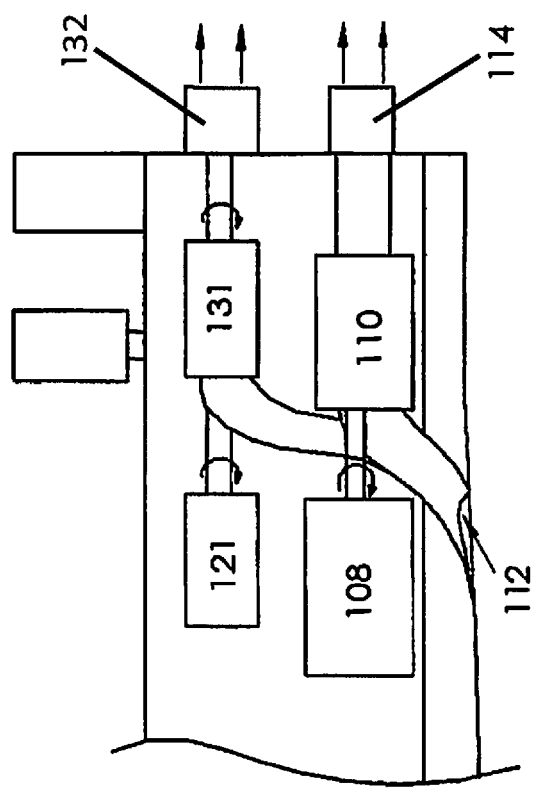
FIG. 9 is a similar view of a first variant.

In a variant of FIG. 9, the electric motor drives a subsidiary jet drive 131 drawing from the inlet 112 and out through a secondary, submerged jet nozzle 132 mounted above that the primary, surface jet nozzle 114.

Figure 10:
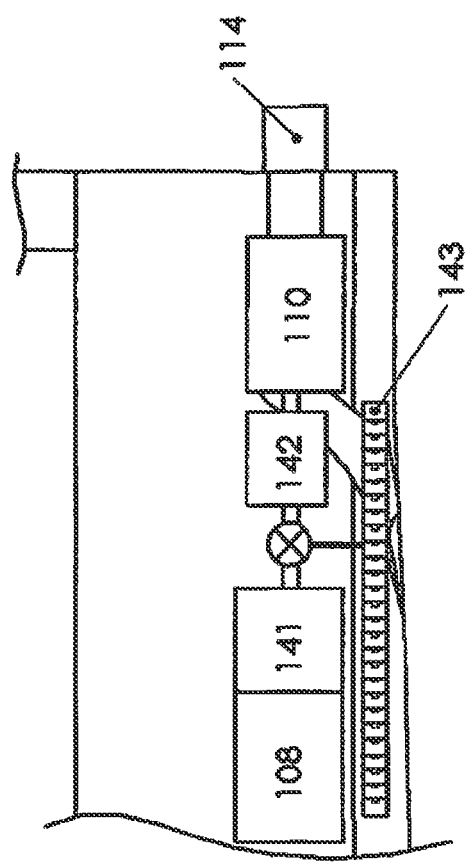
FIG. 10 is a similar view of a second variant.
Figure 11:
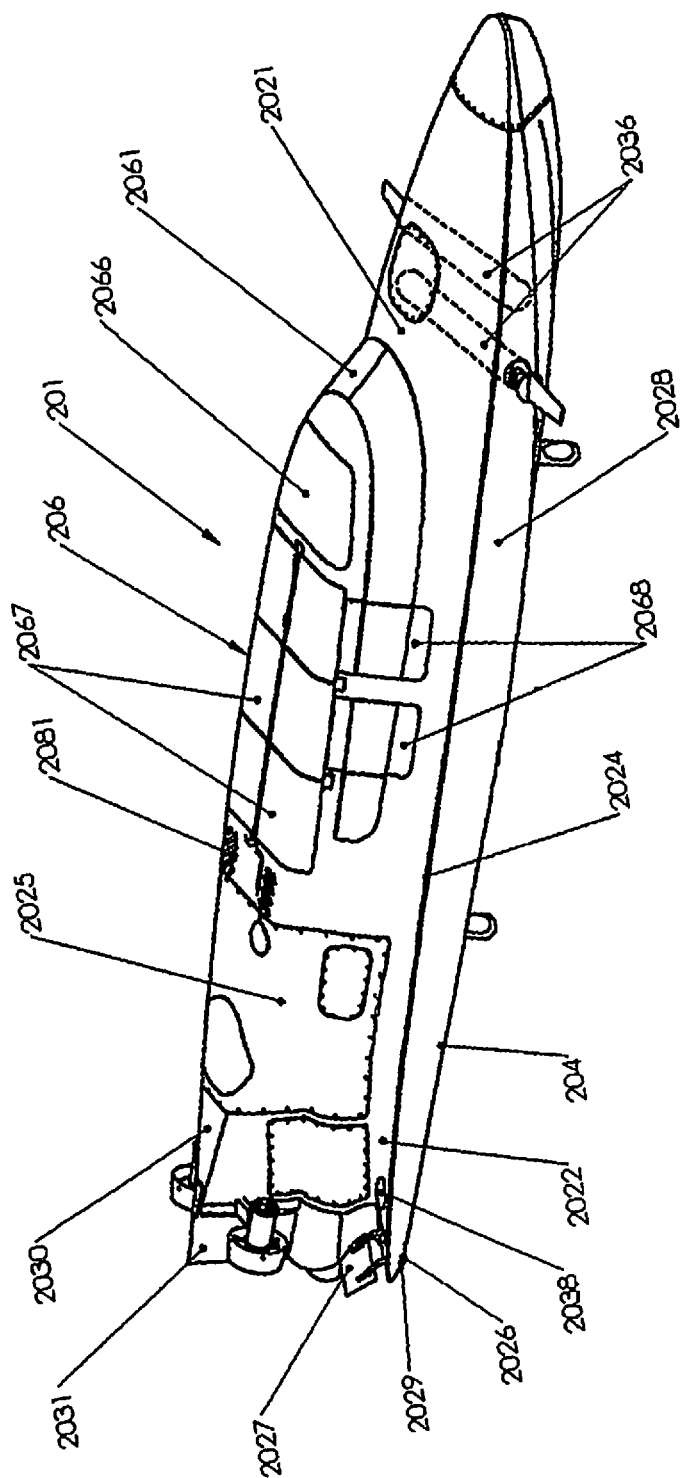
FIG. 11 is a perspective view of a third craft of the invention.
Figure 12:
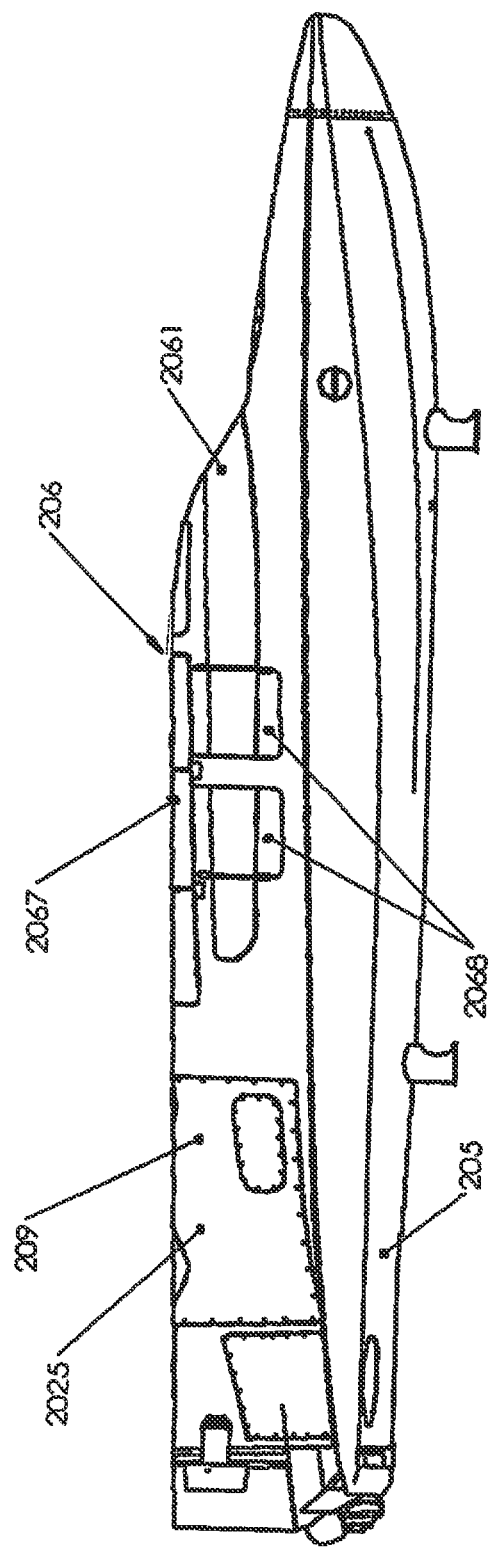
FIG. 12 is a side view of the craft of FIG. 12.
Figure 13:
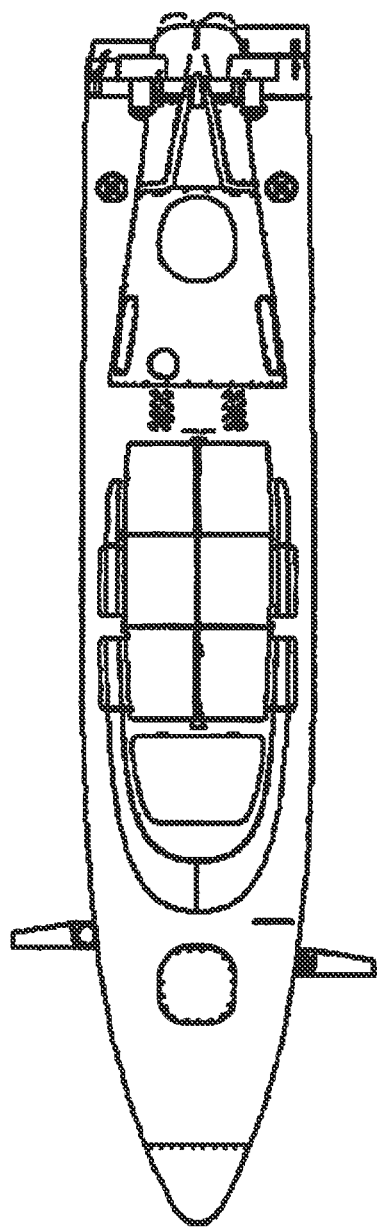
FIG. 13 is a plan view of the craft of FIG. 12.
Figure 14:
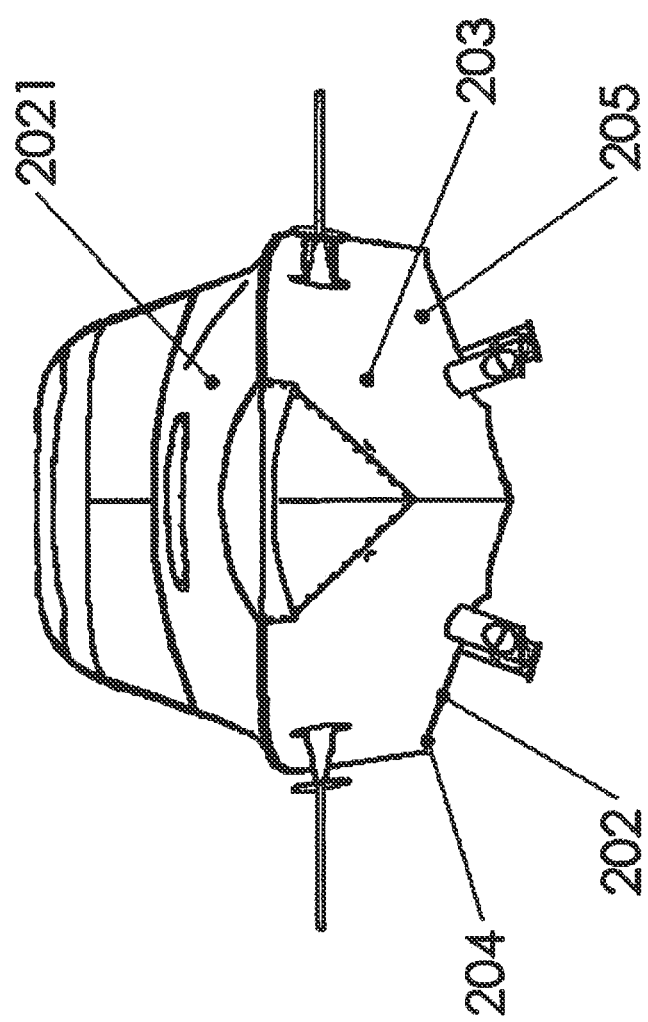
FIG. 14 is a bow view of the craft of FIG. 12.
Figure 15:
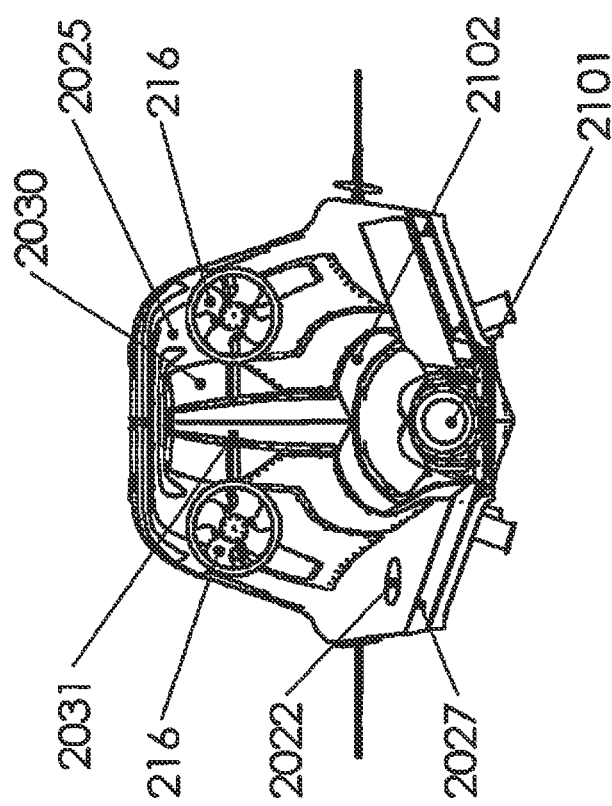
FIG. 15 is a stern view of the craft of FIG. 12.
Figure 16:
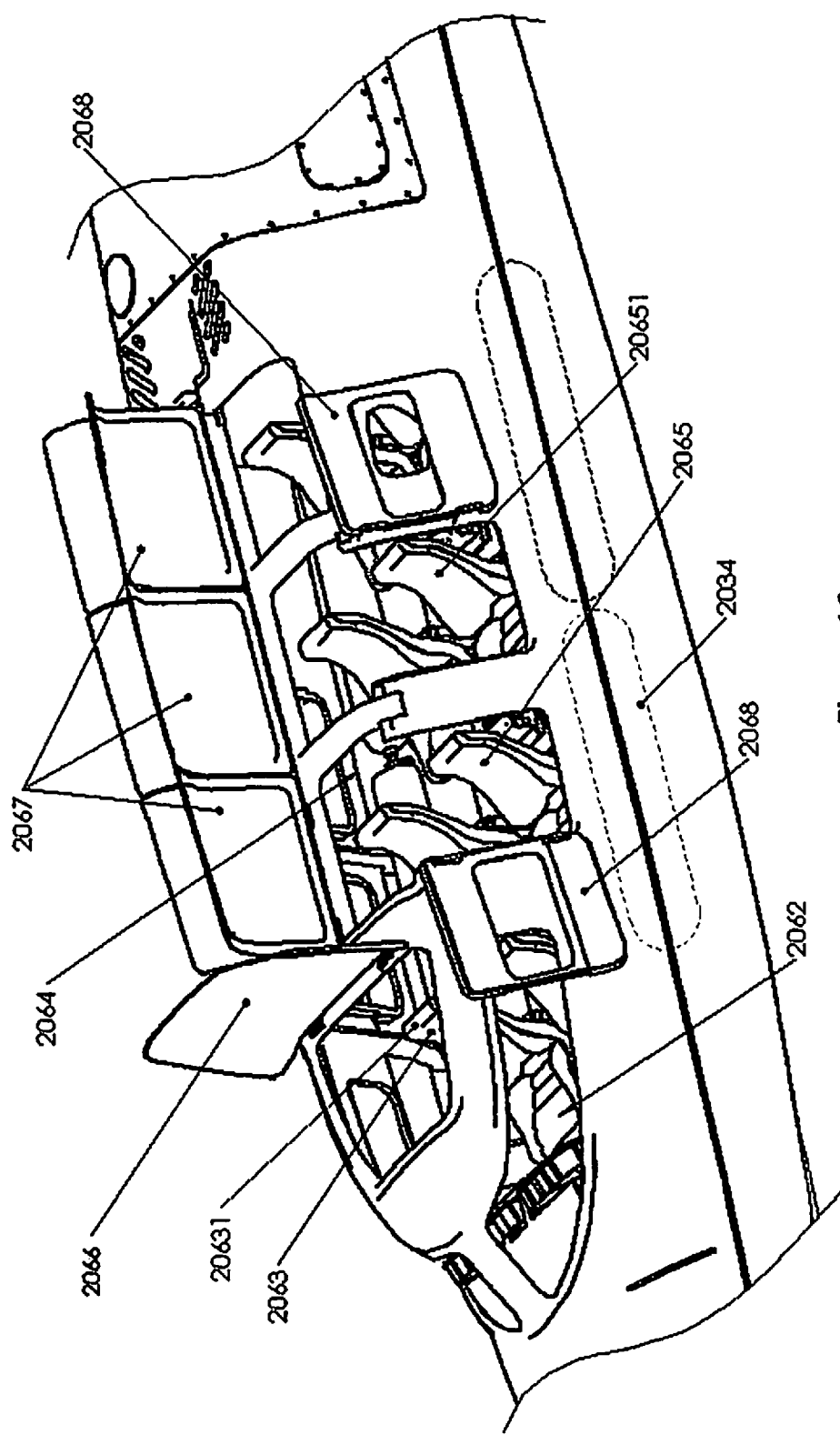
FIG. 16 is a scrap view of crew accommodation of the craft of FIG. 12.
Figure 17:
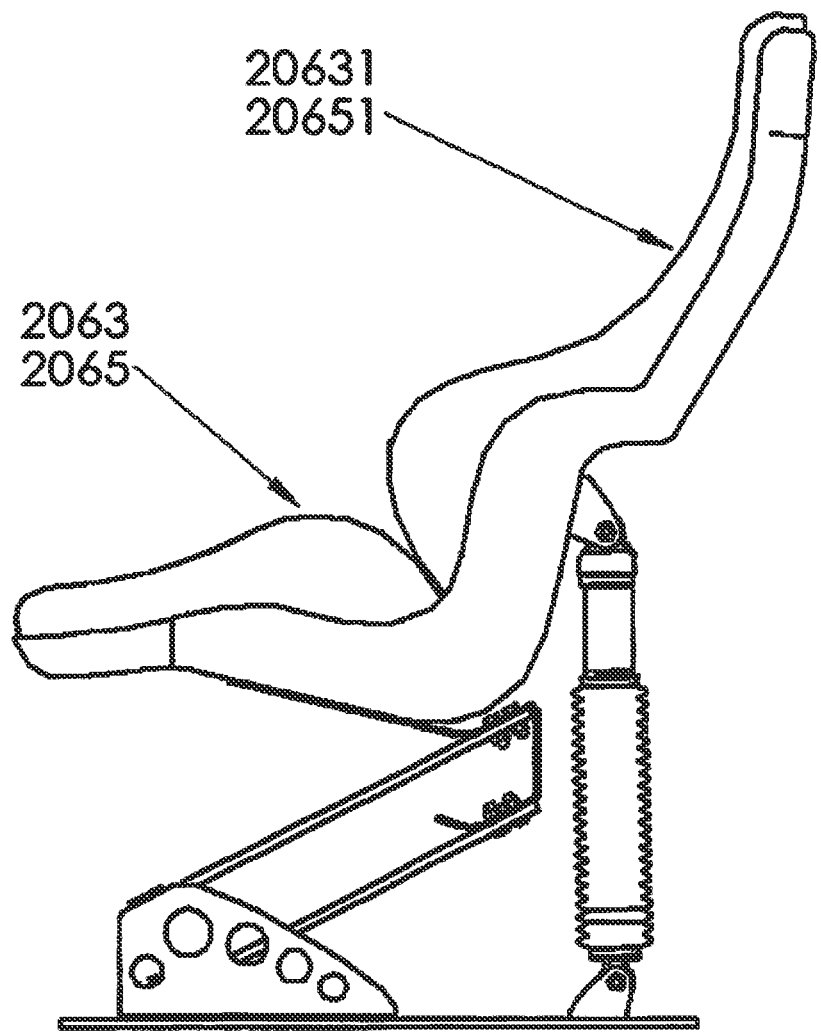
FIG. 17 is a side view of a seat of the craft of FIG. 12.
Figure 18:
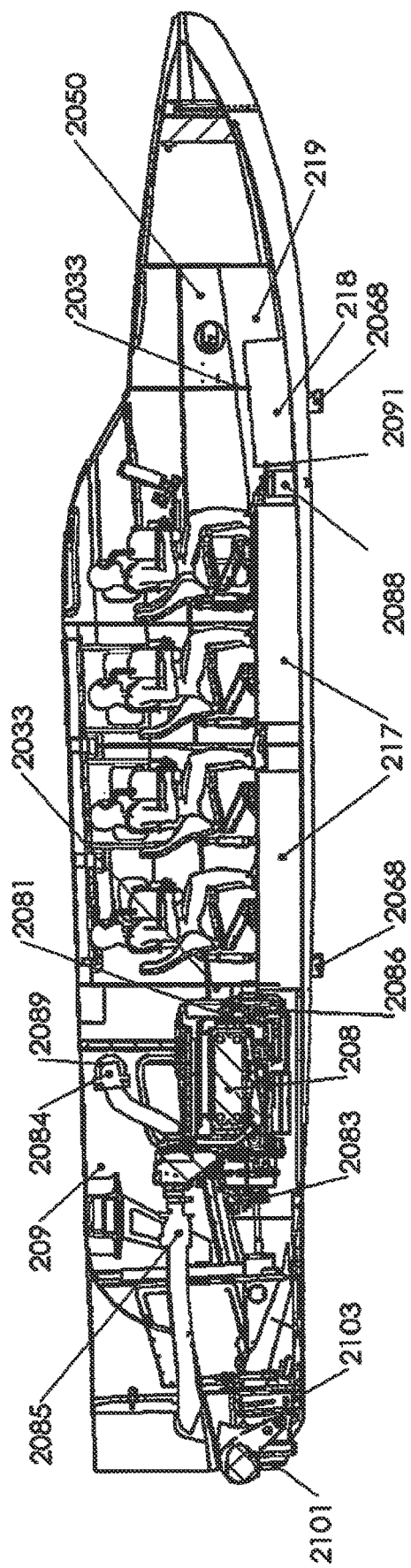
FIG. 18 is a central cross-sectional side view of the craft of FIG. 12.
Figure 19:
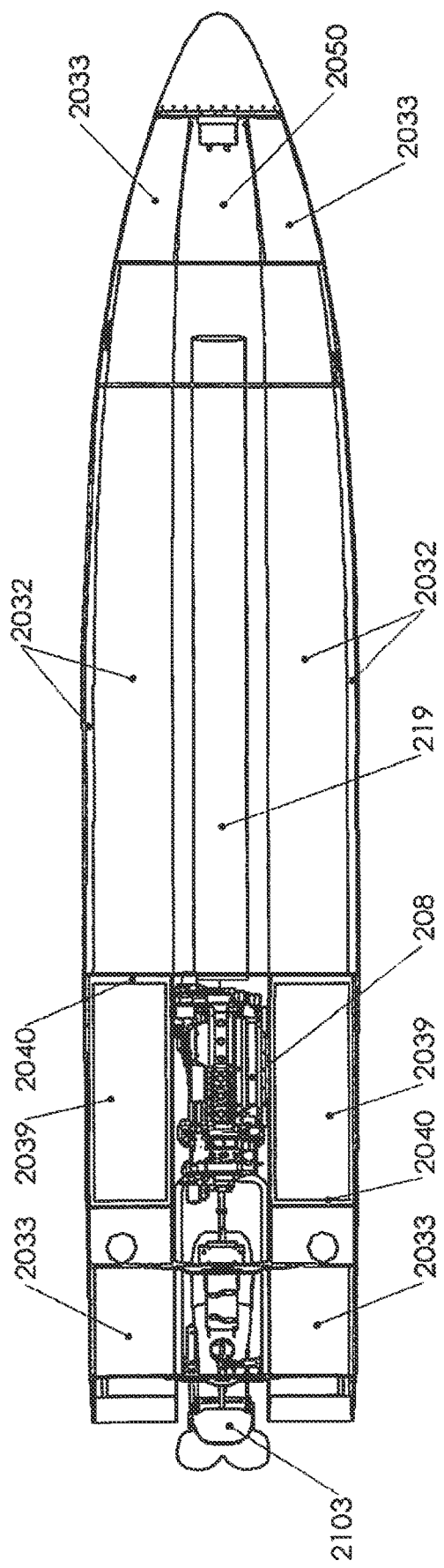
FIG. 19 is a plan view ballast and trim tanks of the craft of FIG. 12.
Figure 20:
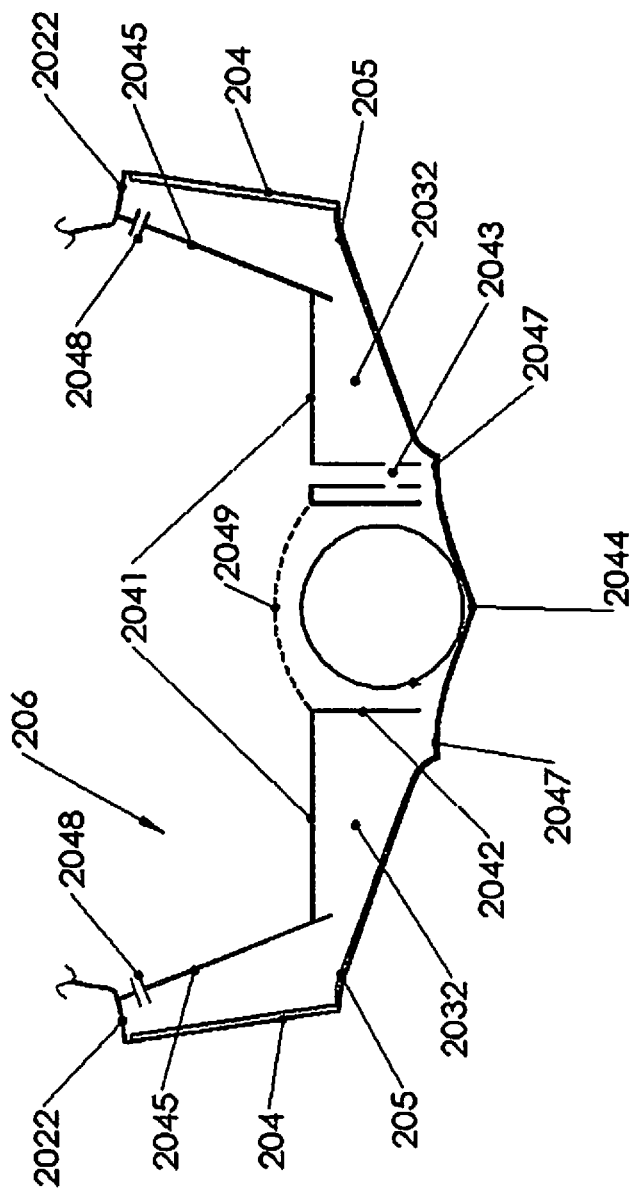
FIG. 20 is a transverse cross-sectional view of the craft of FIG. 12 at the crew accommodation showing the ballast tanks.
Figure 21:
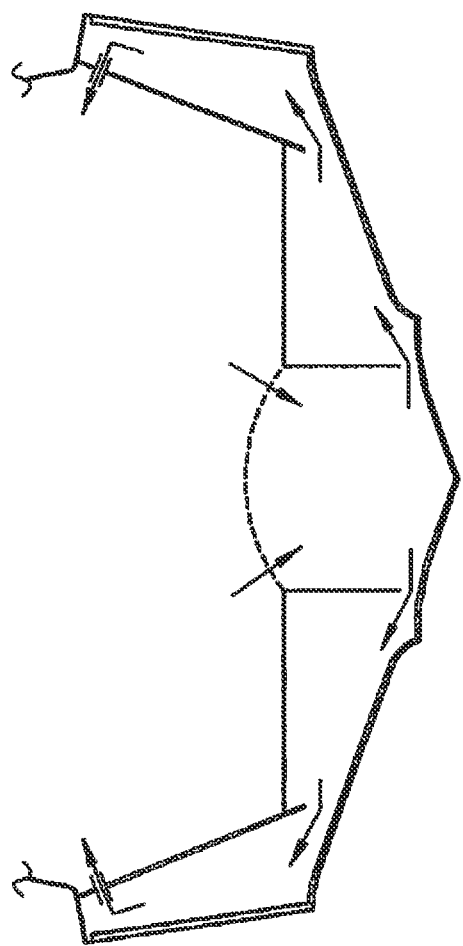
FIG. 21 is a view similar to FIG. 20 showing flooding of the ballast tanks.
Figure 22:
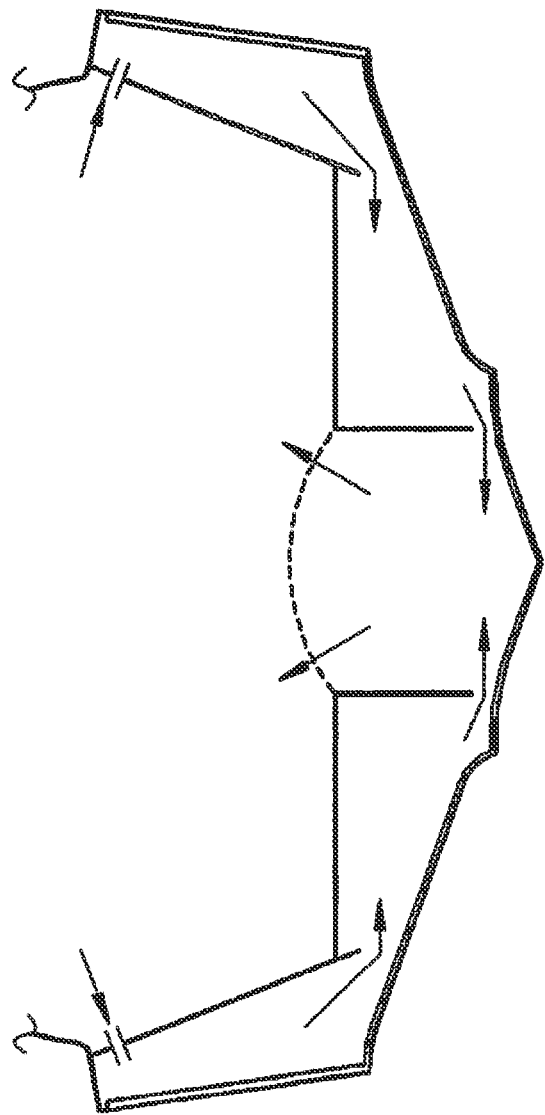
FIG. 22 is a view similar to FIG. 20 showing blowing of the ballast tanks.
Figure 23:
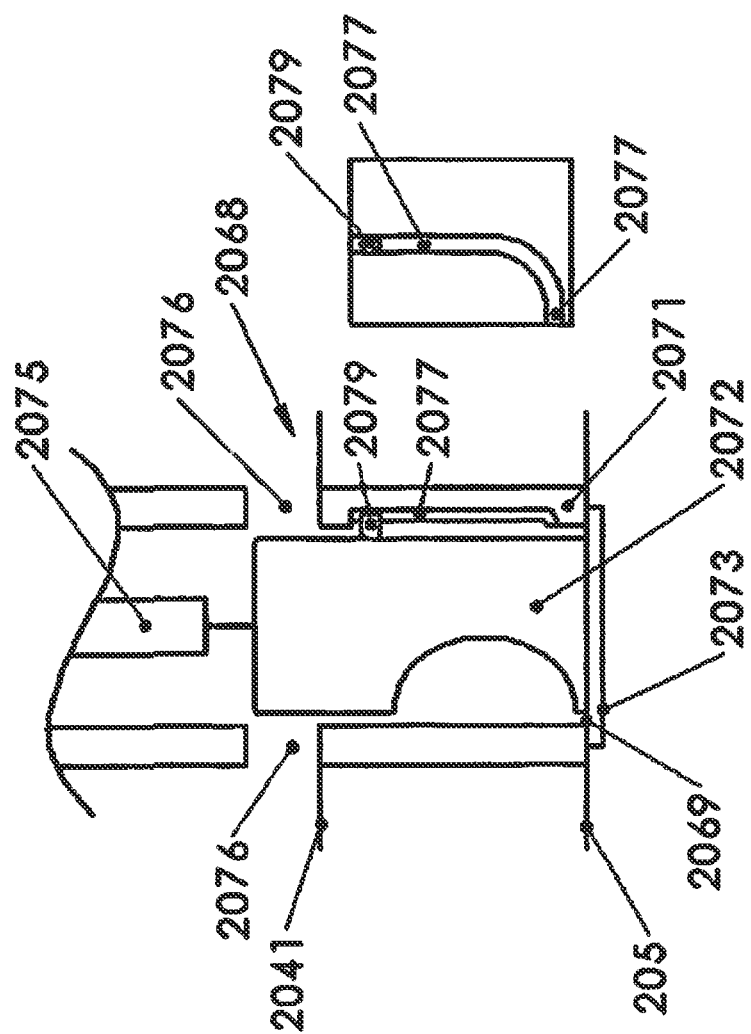
FIG. 23 is a scrap view of a hull flooding and draining scoop of the craft of FIG. 12, together with a groove and follower sketch.
Figure 24:
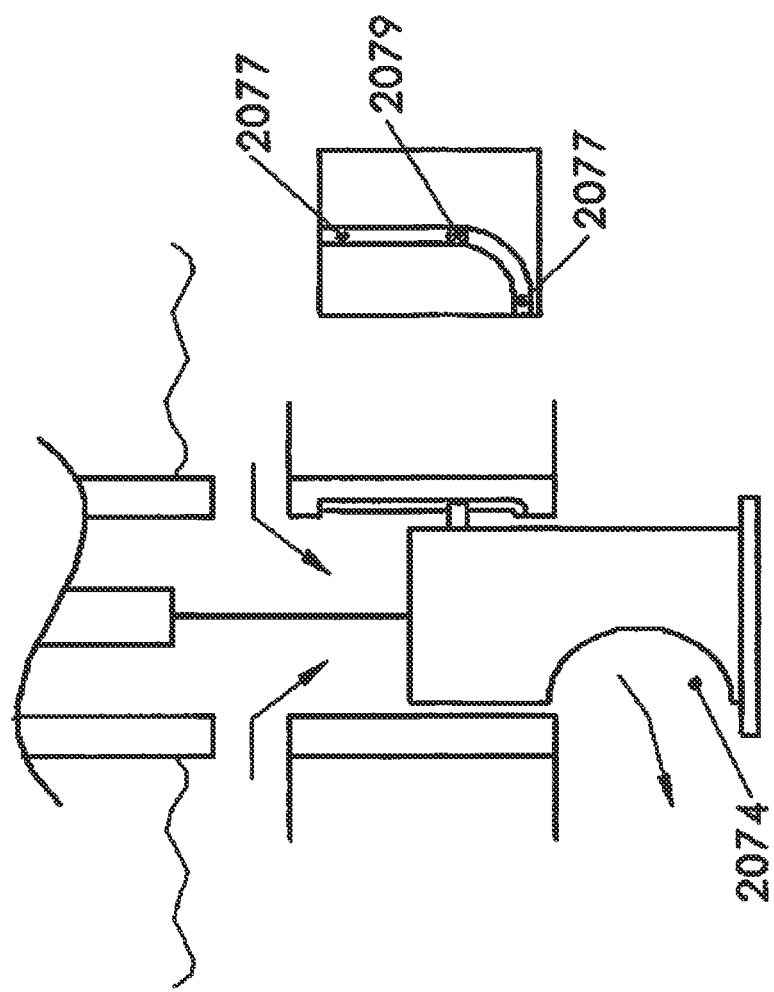
FIG. 24 is a similar scrap view of the scoops in their draining position.
Figure 25:
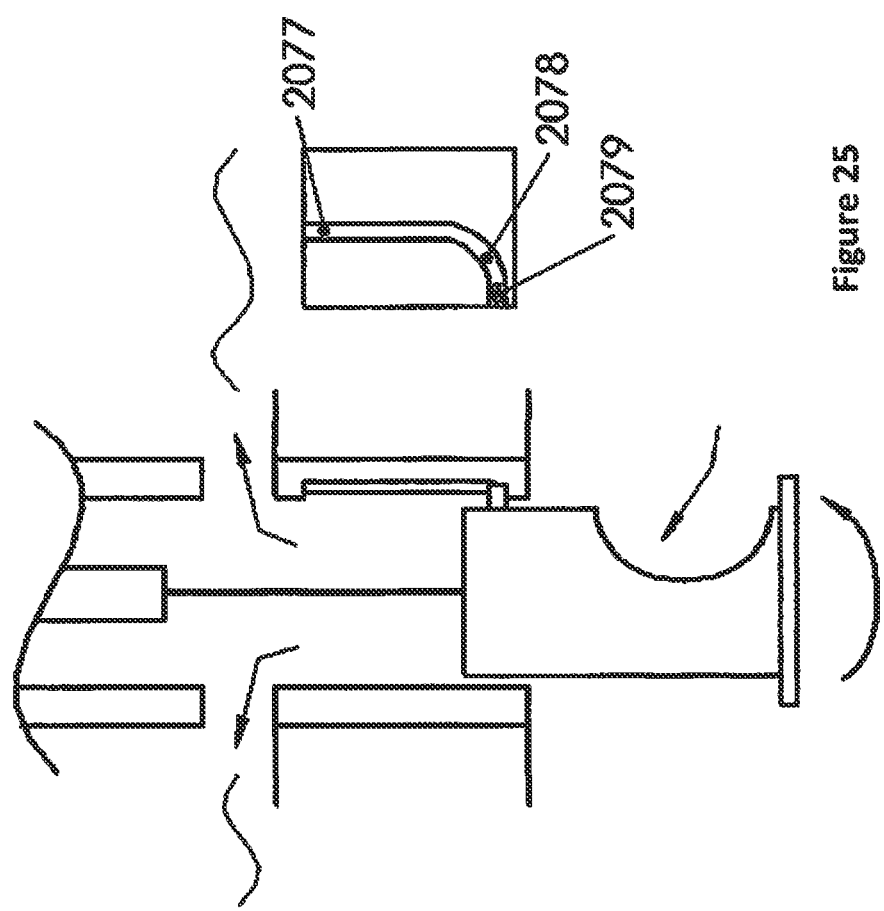
FIG. 25 is a further similar scrap view of the scoops in their flooding position.

In a second variant of FIG. 10, the IC engine 108 drives a generator 141 with the main jet drive 110 being powered by an electric motor 142, itself powered by the generator. For submerged travel the latter can be powered by batteries 143. The IC engine itself has capacity to spare as regards power to drive the jet drive, whereby it can recharge the batteries 143 via the generator during surface passage after a dive.

Reverting to the crew accommodation, four pairs of seats 151 are provided. Conveniently each of the aftermost pair of seat is provided with conning controls 152 and instruments 153. The canopy is formed of two port & starboard arcuate, part-cylindrical sections 154,155 mounted between upper and lower pairs of rollers 156 at the gunwale 157 of the craft. The canopy sections and the rollers are aligned fore and aft, with the arcuate centre 158 of the sections being amidships. Further pairs of rollers 159 are provided inside the skin 160 of the hull on the locus of the sections centred on centre 158. The arrangement is such that the canopy sections can be raised, as by powering of the rollers, to close the hull accommodation in the middle above the seats. A number of latches 161 are provided along the canopy edges for keeping the canopy closed. With the latches released, the canopy sections can roll down under the crew accommodation, beneath a deck 162 and sides 163 of the accommodation. The arrangement fails safe in the open position. At the bow, a closure semi-cone 164 is provided, shaped complementarily to the canopy in its closed position. Aft of the crew accommodation, the canopy and the deck 165 over the engine compartment 109 are faired in for streamline-ness. Both of the canopy sections and the closure semi-cone are conveniently of transparent acrylic material whereby the crew can see out of both when the craft is submerged and indeed when it is travelling on the surface with the canopy closed.

It is envisaged that the crew will wear diving gear, obviating the need for fluid tightness of the canopy.

Buoyancy tanks, air reservoir tanks, crew air bottles, trim surfaces, skegs aft fuel tanks can be provided as in Our Earlier International Application. The craft can be steered when submerged by slowing one of the thrusters or indeed reversing one.

Referring now to FIGS. 11 to 28, another craft 201 of the invention is shown, with a planing hull form 202 with a V cross-sectional shape 203 forrard blending into hard chines 204 with flatter runs aft 205, providing planing surfaces. Forrard of a crew accommodation 206, the hull has a sea-shedding, fore deck 2021, which fairs on both sides into side decks 2022 alongside the crew accommodation. These decks continue with parallel outer edges 2024 to the stern of the craft. Aft of the crew accommodation the top sides 2025 of the hull narrow, with widening of the side decks. Here they are generally parallel to the runs aft 205, with the side decks being angled slightly upwards and outwards. At their aft end, the side decks and the runs aft 205 fine to pintail form 2026, with hydroplanes 2027 aft of them for submerged use, without a transom as such. Forrard of the pintail form the hull has substantially upright side strakes 2028 between the hard chines 204 and the deck edges 2024. The aft end of the runs aft have recesses for trim tabs 2029 for surface planing use. The hull is of fibre reinforced plastics material.

At the front of the crew accommodation, within an aft-sloping, transparent front shield 2061, there is provided a conning and navigation portion 2062 of the crew accommodation, with long travel sprung seats 2063 for a pilot and a navigator. Aft of these in a main portion 2064 of the crew accommodation are six further such seats 2065 for divers to be delivered to a destination. The seats have recesses 20631, 20651 to accommodate the crew's divers' air bottles or rebreather units. A rear-hinged, top hatch 2066 is provided over the forrard seats 2063 with centrally-hinged gull-wing hatches 2067 over the other seats. Side doors 2068 are provided along the accommodation. Thus the crew are enclosed from surface and submerged buffeting during passage, and yet are able to readily exit the craft whilst submerged on arrival at their destination.

Aft of the crew accommodation the top sides 2025 narrow at an engine compartment 209 and fines to a pintail form 2030 with a rudder 2031 aft. Between the trim tabs 2028 and below the rudder 2031, a water jet nozzle 2101 is arranged. The topside is faired with an upwardsly convex and downwards sloping shape 2102 to the water jet nozzle.

Mounted on either side of the top side fin are two electric thrusters 216, for submerged propulsion. High and low voltage batteries 217, 218 for the thrusters and other systems are stowed in a battery compartment 219 described below.

The hull is shaped overall for submerged up lift on the forrard part of the planing hull form 202 to be balanced by the falling-away-forrard fore deck 2021 and the front shield 2061, which both provide hydro-dynamic, down-force. This is augmented by the elevated position of the thrusters 216 and the falling away aft of the side decks. The craft can be trimmed when submerged with minimal use of the trim tabs 2028 and trim tanks described below. The craft's attitude under may be different under way submerged to static attitude on the surface and its planing attitude, which will be bow up. As is conventional with a submarine, the craft has floodable ballast tanks 2032, trim tanks 2033 and compressed air bottles 2034 for blowing the tanks. The positioning of the tanks is described below, whilst the air bottles are provided alongside the crew seats 206, i.e. in the crew accommodation.

Mounted in the engine compartment 209 is a marinised diesel engine 208, coupled to the water jet drive 2103 for surface propulsion. The marinisation of the engine is to such a standard that the engine compartment can be flooded when the craft is submerged. For instance, the alternator, for charging the systems and engine starting battery 218 independent of the thruster batteries 217, and the starter motor are hydraulic mechanisms 2081,2083 hydraulically connected to a remote alternator and a remote hydraulic pump, neither shown as such, provided in sealed compartments. (Being a marinised diesel engine it is water cooled with no cooling fan.) The air inlet to the engine and the crankcase breather is provided with a motorised valve 2084 for closing these whilst submerged. Similarly the exhaust has a motorised valve 2085, also for closing the exhaust when submerged. Motorisation of these valves enables the engine to be shut down during diving/submerging. This in turn enables the craft to be driven below the surface until the water level is such as to be close to the engine's air inlet.

Scoops 2068 are provided for forcing water into the hull as it is diving. These further described below, but the craft's structure below that accommodation's deck 2041, i.e. sole of the craft, is now described first. Two longitudinals 2042, 2043 on either side of the keel 2044 extend up from the bottom of the hull to the deck 2041. Thus there is provided the battery stowage compartment along the keel. This floods when submerged with the battery is kept hermetically sealed and houses the batteries 217,218. These are hermetically sealed enclosures. To either side of the battery compartment 219 are provided ballast tanks 2032. These are formed from hull plates, including the runs aft 205 and the hard chines 204, bulkheads 2033, the accommodation deck 2041 and accommodation sides 2045. The longitudinals 2042,2043 are provided with scallops 2046 at their bottom edges giving communication to the battery compartment 219; and accommodation sides are provide with lower scallops 2047 and upper air escape/blowing points 2048. On submerging the scoops fill the crew accommodation with water draining into the battery compartment 219 through a mesh or grating 2049 over the batteries in the battery compartment. An air valve in communication with the upper air point 2048 allows displaced air to escape. For surfacing, the air escape valve is closed and air from the bottles 2034 is fed to the tanks via a different valve, neither valve being shown, blowing the water out back into the battery compartment. provided with valves (not shown) for blowing them from the air bottles as required. The tanks are at least partially blown via the mesh 2049. Thus the integrity of the hull is maintained without the need for a ballast blowing cock in the skin of the hull. On diving the air in the tanks is vented allowing water which has been scooped inboard to flood the ballast tanks.

Similarly trim tanks 2033 are provided as a single forrard tank and twin aft, port and starboard aft. The trim tanks are provided at the ends of the hull, the forrard one below the fore deck and the aft ones just forrard of the aft pintail forms. Their construction and operation is similar to that of the ballast tanks.

It should be noted also that, except for the forrard trim tank, the bow compartment 2050 forwards of the crew accommodation is open, at least to water flow from the crew accommodation via the battery compartment. Equally engine compartment 209 is similarly in water communication with the crew accommodation. Thus all main voids within the hull either flood together or drain together. The hull does not have openable/closable airtight bulkheads.

The scoops 2068, referred to above are provided fore & aft and port & starboard in the crew accommodation. They are essentially circular cylindrical devices extending from hull apertures 2069 to sole apertures 2070, i.e. allowing water flow from outside the hull into it, and in particular the crew accommodation, or vice versa. They have out fixed tubes 2071, water-tightly bonded to both the hull and the sole. They pass through and are sealed from the ballast tanks. Movable inner ducts 2072 are arranged within the fixed tubes and have a lower closure plates 2073 larger than the tubes and angled to complement the local angling of the hull bottom. When the scoops are closed, the plates close the hull apertures 2069. The inner ducts have open tops and ports 2074 in them just above the closure plates. On initial axial movement down of the ducts, by upper actuators 2075, the ports face aft. Thus when the craft is travelling ahead, vacuum behind the lower end of the ducts being moved through the water draws water and/or air entering the ducts from above down the ducts and out of the craft in the manner of sailing dinghies' auto-balers. If the ports were to face forwards, water would be forced into them and up their ducts into the crew accommodation via ports 2076 in the outer tubes and the rest of the hull open to the accommodation. Such movement can be achieved by further movement of the actuators. For this one or other of the ducts and the tubes is formed with grooves having initial movement straight sections 2077 and further movement part helical sections 2078. The other of the ducts and tubes has followers 2079 fast with them and engaged in the grooves. The followers control the angle of the ducts. Thus initial downwards movement of the ducts with the ports facing aft causes the scoops to suck water from the crew accommodation as on surfacing of the craft and continued downwards movement turns the ports to face forrard and causes the ducts to convey water into the crew accommodation, as in diving, In the preferred embodiment, the grooves are in the outer tubes and the followers 2079 are fast with the inner ducts.

On diving, under forward propulsion from the main engine 208 and the jet drive 2101, the scoops are fully deployed. These force water into the hull, which begins to flood, causing the craft to sink in the water. Once the sole is covered with water it drains into the battery compartment via the grating 2049. With the ballast tanks having their valves open, they fill with water. Equally on surfacing, under power of the thrusters 216, the scoops are deployed to their initial extent. This has the effect of drawing water from the compartments and their filling with air. Equally the ballast tanks are blown and their water is drawn out.

The crew accommodation is not airtightly sealed in that air can escape via vents 2081 in the top of the crew accommodation. The engine compartment vents at a radome 2105 provided on a vertical slide, whereby for surface travel, the radome can be elevated for use and for submerged travel, it can to withdrawn to be flush with the topside. The engine compartment 209 and the bow section 2050 flood from the battery compartment.

The scoops can drain the hull only to just above the level of the sole. The craft can no longer be driven by the thrusters 216. However, the engine air inlet 2089 is then well clear of the water and the main engine can be started. Its cooling water circuit has a diverter 2086, leading to a suction low in the hull, in communication with the battery compartment 219. Thus the hull can be pumped substantially dry and the craft quickly brought to the plane. To avoid running the main engine without cooling, the diverter is closed after a limited period and any residual water is pumped out by an auxiliary pump 2088.

To aid submerged control, the craft has forward hydroplanes 2034, forrard of the crew accommodation and extending from the hull on opposite sides above the hard chine, so as to be above the water when the craft is surfaced. At the roots of the hydroplanes up/down thrusters 2035 are mounted. Whilst the hydroplanes would be out of the water during planing, they are arranged to be telescopically withdrawable into a pair of adjacent tubes 2036, traversing the hull to protect them and reduce aerodynamic drag. In normal submerged use, the thrusters 2035 are not exposed and discs 2037 at the root of each plane closes the tubes 2036. Further up/down thrusters 2038 are aft between the side decks 2022 and the bottom of the hull. The thrusters can be used in diving and surfacing to speed these operations. However their main purpose, together with those aft is to allow stopped ascent or descent in the water.

The sequence of operations, under control of an auto-diving/surfacing controller are as follows:
1. To dive from the plane, the main engine is throttled back for the craft to come off the plane,
2. The scoops are actuated to force water into the hull,
3. The forrard hydroplanes are deployed and set to a diving angle,
4. The main engine is kept running at reduced revs until the hydroplanes are submerged and driving the craft below the surface,
5. The engine is cut and its inlet and exhaust motorised valves closed,
6. With the craft diving under momentum and reduced buoyancy, the trim tanks flood and the vertical thrusters are powered and hasten the dive,
7. As the sub-surface drive thrusters move below the surface, they provide thrust to continue the dive,
8. With craft submerged, it can be trimmed as a conventional submarine, with the vertical thrusters closed down.

Surfacing is the reverse procedure. A final stage of this is trimming of the craft planing attitude with the trim tabs 2029.

Figure 26:
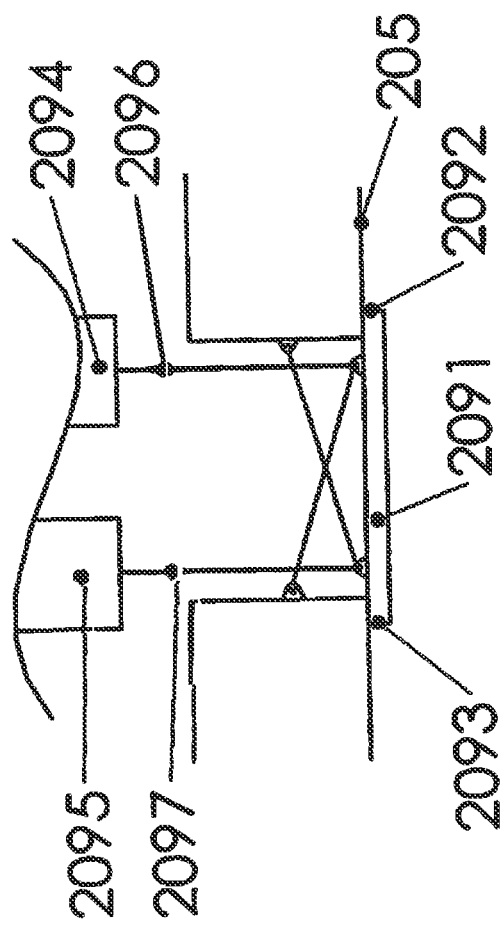
FIG. 26 is a view similar to FIG. 23 of an alternative hull flooding and draining scoop of the craft of FIG. 12, together with a groove and follower sketch.
Figure 27:
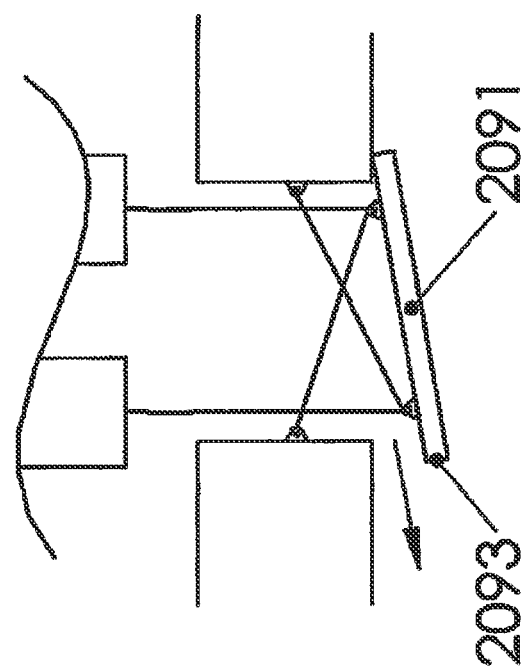
FIG. 27 is a view similar to FIG. 24 of the alternative scoop.
Figure 28:
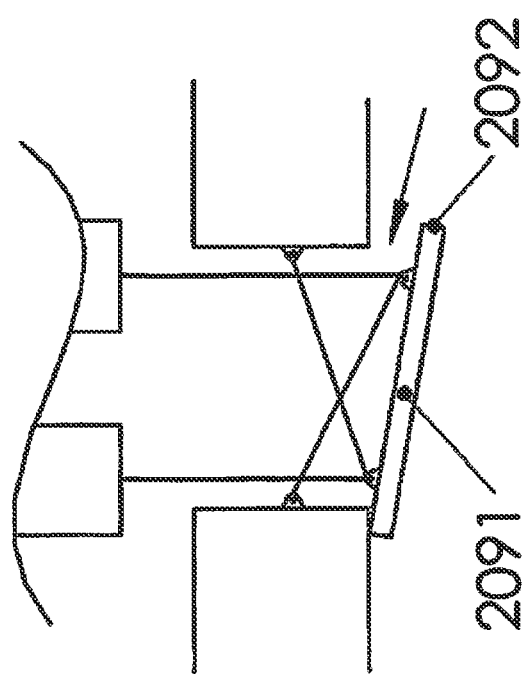
FIG. 28 is a view similar to FIG. 25 of the alternative scoop.

The invention is not intended to be restricted to the details of the above described embodiment. For instance, the jet drive could be replaced by an outdrive should this be thought to have particular advantage. The scoops can be configured quite differently as shown in FIGS. 26 to 28. These scoops have gates 2091 which normally close the hull apertures to provide a substantially smooth hull bottom 205. To open the scoops, the gates can be extended down at either their front or back edges 2092,2093 by fore and aft actuators 2094, 2095 into the water below the hull. The scoops are linked by links 2096,2097 from front or rear edges respectively to opposite edges of their hull apertures. The arrangement allows the rear edge of the gates to be driven down for suction of water from their compartments or the forward edge to be driven down for scooping water into their compartments, both effects requiring forward motion of the craft.

A detail not otherwise mentioned above is that bladder fuel tanks 2039 are provided in compartments 2040, similarly arranged to the aft trim tanks 2033, between the latter and the ballast tanks 2032. This is on either side of the engine. Use of bladder fuel tanks avoids undesirable buoyancy on diving with depleted fuel, as would be case with fixed volume fuel tanks.

The invention claimed is:

1. A surface/submersible water-craft, comprising:
   a hull,
   a first engine for submerged propulsion provided in or on the hull,
   a second engine for surface propulsion provided in or on the hull,
   a floodable-on-submerging engine room containing the second engine for surface propulsion, the floodable-on-submerging engine room provided in the hull, and
   sea cocks and air ports provided for the hull, wherein the sea cocks are closable when not in use,
   whereby in diving the floodable-on-submerging engine room can be filled with water via the sea cocks from below with upwards escape of air through the air ports and in surfacing the floodable-on-submerging engine room can be drained of water via the sea cocks from below with ingress of air through the air ports.

2. The surface/submersible water-craft of claim 1, wherein the entirety of the interior of the hull, save only stowage spaces for equipment which must be kept dry, and ballast and trim tanks are floodable-on-submerging.

3. The surface/submersible water-craft of claim 1, wherein the surface/submersible water-craft further comprises ballast and trim tanks which are floodable-on-submerging from within the hull and blowable into the hull.

4. The surface/submersible water-craft of claim 1, wherein the submerged propulsion means is electrical with propellers above a normal waterline when surfaced.

5. The surface/submersible water-craft of claim 1, wherein the surface propulsion means comprises a jet drive.

6. The surface/submersible water-craft of claim 1, wherein the hull is formed for considerably greater speeds on the surface than submerged and has a wave piercing or planing hull form.

7. The surface/submersible water-craft of claim 1, wherein the hull is provided with hydrofoils for surface travel, the hydrofoils being withdrawable for submerged travel.

8. The surface/submersible water-craft of claim 1, wherein the hull includes side decks complementary aft with the hull's planing hull form, the side decks being angled upwards.

9. The surface/submersible water-craft of claim 8, wherein the side decks and the hull bottom taper aft to laterally extending pintail forms, the pintail forms provided with adjustable trim surfaces.

10. The surface/submersible water-craft of claim 8, including vertically oriented thrusters mounted in apertures in the side decks, the apertures being closable for surface passage.

11. The surface/submersible water-craft of claim 1, including upper sides tapering aft to an upright pintail form, the pintail form provided with a rudder.

12. The surface/submersible water-craft of claim 1, including forrard hydroplanes mounted above a surface water line, the forrard hydroplanes including vertical thrusters mounted in them.

13. The surface/submersible water-craft of claim 12, wherein the hydroplanes are elongate and telescopically withdrawable into housings arranged laterally of the hull, wherein one of the housings is behind the other to allow each of the housings to be fixed to both sides of the hull.

14. A surface/submersible water-craft, comprising:
   a hull,
   means for submerged propulsion provided in or on the hull, means for surface propulsion provided in or on the hull, a floodable-on-submerging multi-person crew accommodation provided in the hull, sea cocks and air ports provided for the hull, whereby in diving the floodable-on-submerging multi-person crew accommodation can be filled with water via the sea cocks from below with upwards escape of air through the air ports and in surfacing the floodable-on-submerging multi-person crew accommodation can be drained of water via the sea cocks from below with ingress of air through the air ports, and a canopy arranged for closing the floodable multi-person crew accommodation for protecting the crew from water flow past the craft, the canopy being openable for crew exit from the craft whilst submerged at a destination.

15. The surface/submersible water-craft of claim 14, wherein the canopy is closable whilst submerged at a destination.

16. The surface/submersible water-craft of claim 14, further comprising:

a floodable-on-submerging engine room containing an engine for surface propulsion, the floodable-on-submerging engine room provided in the hull, an engine for surface propulsion contained in a floodable space within the floodable-on-submerging engine room, sea cocks and air ports provided for the hull, whereby in diving the floodable-on-submerging engine room can be filled with water via the sea cocks from below with upwards escape of air through the air ports and in surfacing the floodable-on-submerging engine room can be drained of water via the sea cocks from below with ingress of air through the air ports.

17. The surface/submersible water-craft of claim 16, wherein the second engine is an internal combustion engine and provided with a closable air inlet and a closable exhaust, whereby it can be closed down for immersion on diving and restarted on surfacing and draining of the engine room.

18. The surface/submersible water-craft of claim 16, wherein the sea cocks are provided with directional means for drawing water into the multi-person crew accommodation and the floodable-on-submerging engine room on diving and/or drawing water from the multi-person crew accommodation and the floodable-on-submerging engine room on surfacing.

19. The surface/submersible water-craft of claim 18, wherein the directional means comprise:

at least one flap for normally sealing a hull aperture, at least one link pivotally connecting an aft part of the flap to the hull forward of the aperture, at least one link pivotally connecting a forrard part of the flap to the hull aft of the aperture, means for moving the aft part of the flap down to open the aperture aft of the flap for drawing water from the hull and means for moving the forrard part of the flap down to open the aperture forrard of the flap for drawing water into the hull.

20. The surface/submersible water-craft of claim 18, wherein the directional means comprise:

at least one sleeve extending from within the hull down to a hull aperture around which it is sealed, a respective duct movably arranged within the sleeve, the duct having:
a closed lower end,
a port above the closed lower end and
an open upper end, means for advancing the duct to extend below the hull bottom and withdrawing the duct for the closed lower end to seal the hull aperture and complementary track and follower means in the sleeve and duct for
guiding the duct to expose the port aft wards on initial advance of the duct for sucking water from the hull when moving ahead and for
turning the duct to turn the port forwards on further advance of the duct for drawing water into the hull when moving ahead.

21. A surface/submersible water-craft, comprising:

a hull, means for submerged propulsion provided in or on the hull, means for surface propulsion provided in or on the hull, a floodable-on-submerging engine room containing an engine for surface propulsion, the floodable-on-submerging engine room provided in the hull, an engine for surface propulsion contained in a floodable space within the floodable-on-submerging engine room, and sea cocks and air ports are provided for the floodable-on-submerging engine room, whereby in diving the floodable-on-submerging engine room can be filled with water via its sea cocks from below with upwards escape of air through its air ports and in surfacing the floodable-on-submerging engine room can be drained of water via its sea cocks from below with ingress of air through its air ports, wherein the sea cocks are closable when not in use.

* * * * *